United States Patent [19]

Lin

[11] Patent Number: 5,016,909

[45] Date of Patent: May 21, 1991

[54] AUTOMOBILE SUSPENSION SYSTEM

[76] Inventor: Chien-Hung Lin, No. 150, Chung-Hsiao Rd., Chia-Li Chen, Tainan Hsien, Taiwan

[21] Appl. No.: 525,139

[22] Filed: May 17, 1990

[51] Int. Cl.[5] ............................................ B60G 17/00
[52] U.S. Cl. .................................... 280/707; 280/709; 188/314; 267/217
[58] Field of Search ............... 280/702, 707, 708, 709, 280/710, 714, DIG. 1; 188/314; 267/217

[56] References Cited

U.S. PATENT DOCUMENTS 3,643,970 2/1972 Gauchet .............................. 280/709
4,960,291 10/1990 Lin ...................................... 280/709

FOREIGN PATENT DOCUMENTS

1243964 7/1986 U.S.S.R. ............................. 280/708
0844146 8/1960 United Kingdom ............... 280/702

Primary Examiner—Charles A. Marmor
Assistant Examiner—Michael Shaughnessy

[57] ABSTRACT

An automobile suspension system includes a suspending hydraulic cylinder interposed between the automobile body and an automobile wheel, a tensing hydraulic cylinder attached to the automobile body, an absorbing hydraulic cylinder attached to the automobile body, a hydraulic piping system intercommunicating these hydraulic cylinders, and a processing system sensing road conditions and driving situations to independently adjust the height of the corners of the automobile body, so as to offer shock-absorbing and anti-sway effects.

7 Claims, 10 Drawing Sheets

AUTOMOBILE SUSPENSION SYSTEM

BACKGROUND OF THE INVENTION

This invention relates to an automobile suspension system, more particularly to an automobile suspension system which can offer safety and comfort to the occupants in the automobile by a hydraulic system and a resilient body unit in accordance with the speed of the automobile and various conditions of the road.

Figure 1:
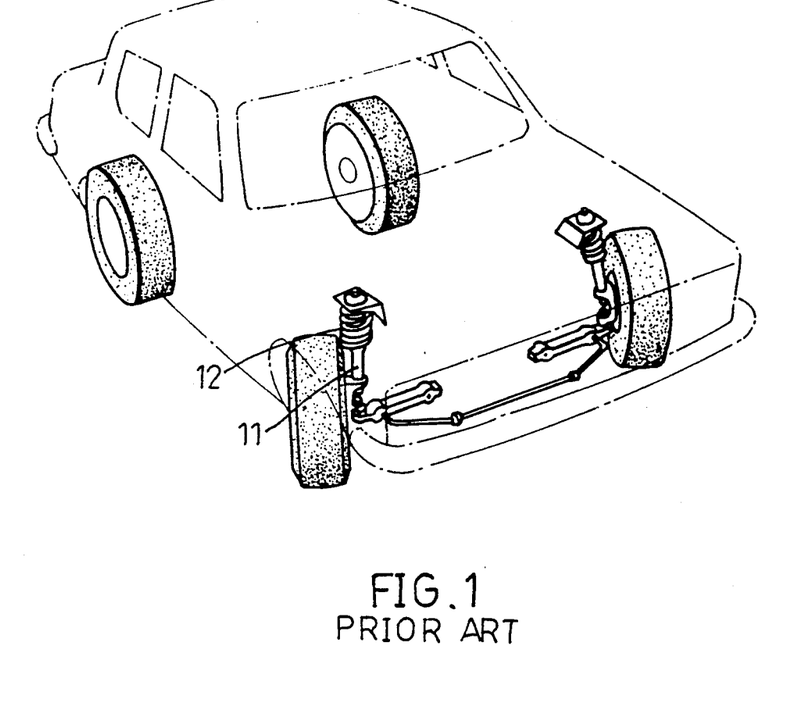
FIG. 1 illustrates a conventional automobile suspension system.

Referring to FIG. 1, a very common independent automobile suspension system includes a supporting rod 11 interposed between an automobile wheel and the automobile body. A hydraulic shock absorber is installed in the supporting rod 11. A shock absorbing spring 12 is sleeved on the upper portion of the supporting rod 11.

In a case where the shock absorbing action of the spring 12 is sufficient to provide comfort, when the automobile is steered, the automobile is apt to sway or even tilt. When the material of the spring 12 is selected to reduce the sway of the automobile to a safe degree, the shock absorbency of the spring 12 is insufficient to provide comfort. As a consequence, safety and comfort cannot be simultaneously obtained.

SUMMARY OF THE INVENTION

It is therefore the main object of this invention to provide an automobile suspension system which can offer safety and comfort to the occupants in the automobile by a hydraulic system and a resilient body unit in accordance with the speed of the automobile and various conditions of the road.

According to this invention, an automobile suspension system includes a suspending hydraulic cylinder interposed between the automobile body and an automobile wheel, a tensing hydraulic cylinder attached to the automobile body, an absorbing hydraulic cylinder attached to the automobile body, a hydraulic piping system intercommunicating these hydraulic cylinders, and a processing system sensing road conditions and driving situations to adjust the height of the corners of the automobile body, so as to offer shock-absorbency and anti-sway effects.

BRIEF DESCRIPTION OF THE DRAWING

Other features and advantages of this invention will become apparent in the following detailed description of a preferred embodiment of this invention, with reference to the accompanying drawings, in which.

DETAILED DESCRIPTION OF THE PREFERRED EMBODIMENT

Figure 2:
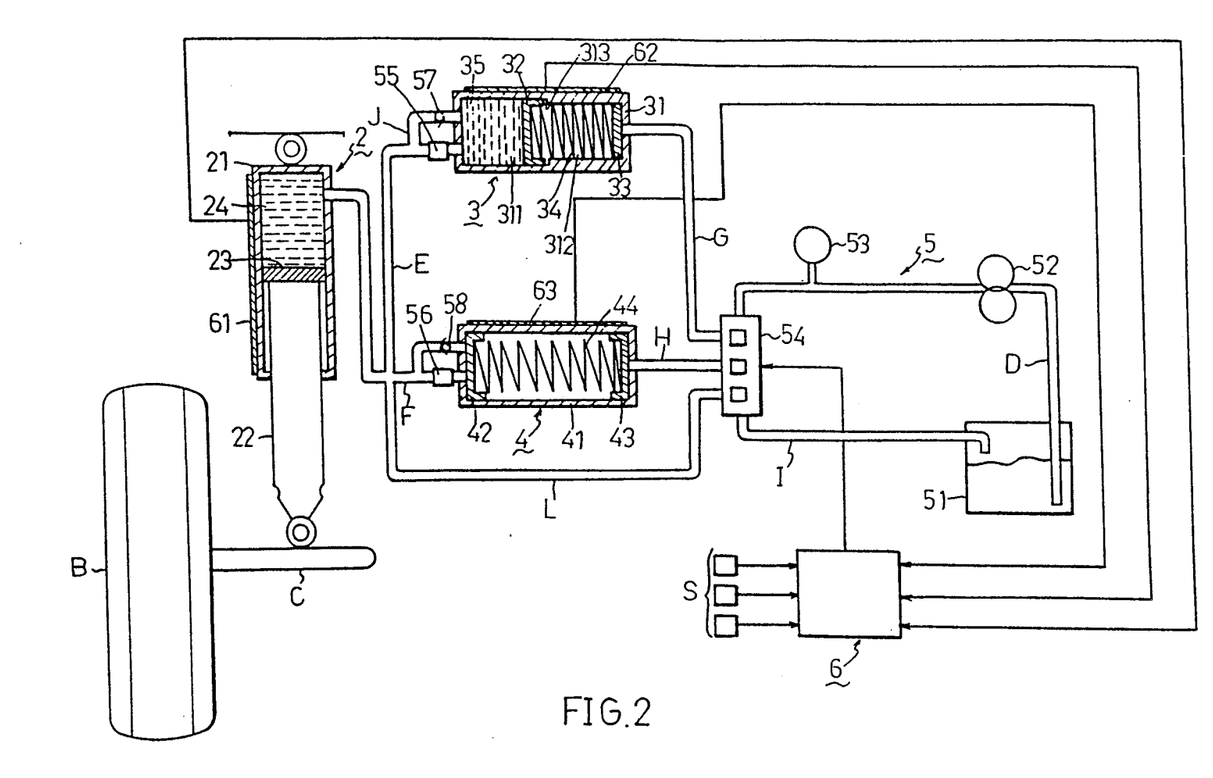
FIG. 2 illustrates an automobile suspension system of this invention when the automobile is unloaded.

Referring to FIG. 2, an automobile suspension system of this invention includes a suspending hydraulic cylinder 2, a tensing hydraulic cylinder 3, an absorbing hydraulic cylinder 4, a hydraulic piping system 5 and a processing system 6.

The suspending hydraulic cylinder 2 has a suspending cylinder body 21 connected pivotally to the bottom of the automobile body, a suspending piston rod 22 connected pivotally to the swing arm (C) of an automobile wheel (B), and a suspending piston 23 connected to the suspending piston rod 22 defining an oil storing space thereabove.

The tensing hydraulic cylinder 3 includes a tensing cylinder body 31 connected securely to the automobile body, which has an upper chamber 311 and a lower chamber 312. As illustrated, the tensing cylinder body 31 has a thin upper wall portion defining the upper chamber 311, and a thick lower wall portion defining the lower chamber 312, between which a shoulder 313 is formed. An upper tensing piston 32 is disposed slidably in the thin upper wall portion of the tensing cylinder body 31, while a lower tensing piston 33 is disposed slidably in the thick wall portion of the tensing cylinder body 31. A tensing spring 34 is interposed between the upper tensing piston 32 and the lower tensing piston 33 in the tensing cylinder body 31. An upper oil storing space 35 is defined above the upper tensing piston 32 in the tensing cylinder body 31, while a lower oil storing space 36 (see FIGS. 4-9) is defined below the lower tensing piston 33 in the tensing cylinder body 31.

The absorbing hydraulic cylinder 4 includes an absorbing cylinder body 41 connected securely to the automobile body, an upper absorbing piston 42 disposed slidably in the upper portion of the absorbing cylinder body 41, a lower absorbing piston 43 disposed slidably in the lower portion of the absorbing cylinder body 41, an absorbing spring 44 interposed between the upper absorbing piston 43 and the lower absorbing piston 43 in the absorbing cylinder body 41. An upper oil storing space 45 (see FIGS. 3, 7) is defined above the upper absorbing piston 42 in the absorbing cylinder body 41, while a lower oil storing space 46 (see FIGS. 4-9) is defined below the lower absorbing piston 43 in the absorbing cylinder body 41.

The hydraulic piping system 5 includes an oil tank 51, an oil pump 52, an accumulator 53 and a two-way valve 54. Oil is fed from the oil tank 51 to the two-way valve 54 through a first conduit (D), on which the oil pump 52 and the accumulator 53 are installed. A second conduit (E) intercommunicates the oil storing space 24 of the suspending hydraulic cylinder 2 and the upper oil storing space 35 of the tensing hydraulic cylinder 3. A fourth conduit (G) intercommunicates the two-way valve 54 and the lower oil storing space 36 of the tensing hydraulic cylinder 3. A fifth conduit (H) intercommunicates the two-way valve 54 and the lower oil storing space 46 of the absorbing hydraulic cylinder 4. The oil in the two-way valve 54 can be returned to the oil tank 51 through a sixth conduit (I). A seventh conduit (J) intercommunicates the second conduit (E) and the upper oil storing space 35 of the tensing hydraulic cylinder 3. A first check valve 57 is installed on the seventh conduit (J), so as to limit the oil flow from the upper oil storing space 35 of the tensing hydraulic cylinder 3 to the oil storing space 24 of the suspending hydraulic cylinder 2 through the seventh conduit (J). An eighth conduit (K) intercommunicates the third conduit (F) and the upper oil storing space 45 of the absorbing hydraulic cylinder 4 and is equipped with a second check valve 58 which limits the oil flow from the oil storing space 24 of the suspending hydraulic cylinder 2 to the upper oil storing space 35 of the tensing hydraulic cylinder 3 through the eighth conduit (K). A ninth conduit (L) intercommunicates the oil storing space 24 of the suspending hydraulic cylinder 2 and the two-way valve 54. A first damper 55 is installed on the second conduit (E) so as to stabilize the spring movement of the tensing spring 34, while a second damper 56 is installed on the third conduit (F) so as to stabilize the spring movement of the absorbing spring 44.

The processing system 6 is a logical circuit unit which receives the signals from a plurality of sensors (S), which are provided on the automobile body or the steering wheel. When the automobile is accelerated or steered, the logical circuit unit signals the two-way valve 54, in response to the signals from the sensors (S), to open the fifth conduit (H) Three piston-position sensors 61, 62 and 63 are respectively installed on the suspending hydraulic cylinder 2, the tensing hydraulic cylinder 3 and the absorbing hydraulic cylinder 4, so as to determine the positions of the pistons 23, 32, 33, 42 and 43.

When nobody is in the automobile, the automobile suspension system of this invention is in the position shown in FIG. 2. In this situation, the lower tensing piston 33 is positioned at the lower end of the interior chamber of the tensing hydraulic cylinder 3. The upper tensing piston 32 is positioned near, but not in contact with the shoulder 313 of the tensing cylinder body 31. The upper absorbing piston 42 is positioned at the upper end of the interior chamber of the absorbing hydraulic cylinder 4, while the lower absorbing piston 43 is positioned at the lower end of the interior chamber of the absorbing hydraulic cylinder 4.

Figure 3:
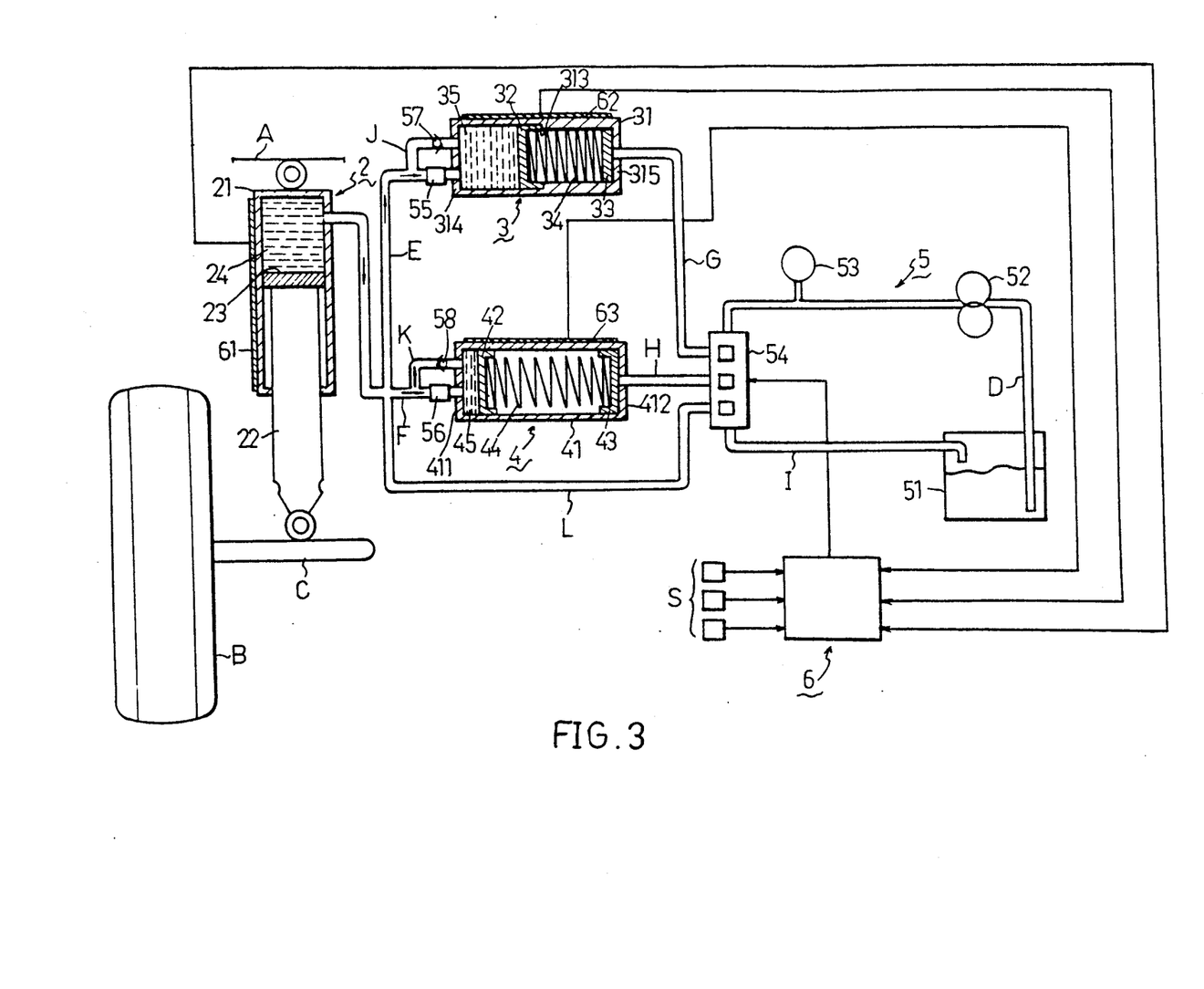
FIG. 3 illustrates the automobile suspension system of this invention when the automobile has just been loaded with one or more people.

Referring to FIG. 3, when one or more persons enter the automobile, when the suspending piston 23 of the suspending hydraulic cylinder 2 moves upward to impel oil toward the tensing hydraulic cylinder 3 and the absorbing hydraulic cylinder 4, so as to push the upper tensing piston 32 downward to contact the shoulder 313. The absorbing spring 44 is therefore compressed by the upper absorbing piston 42.

Figure 4:
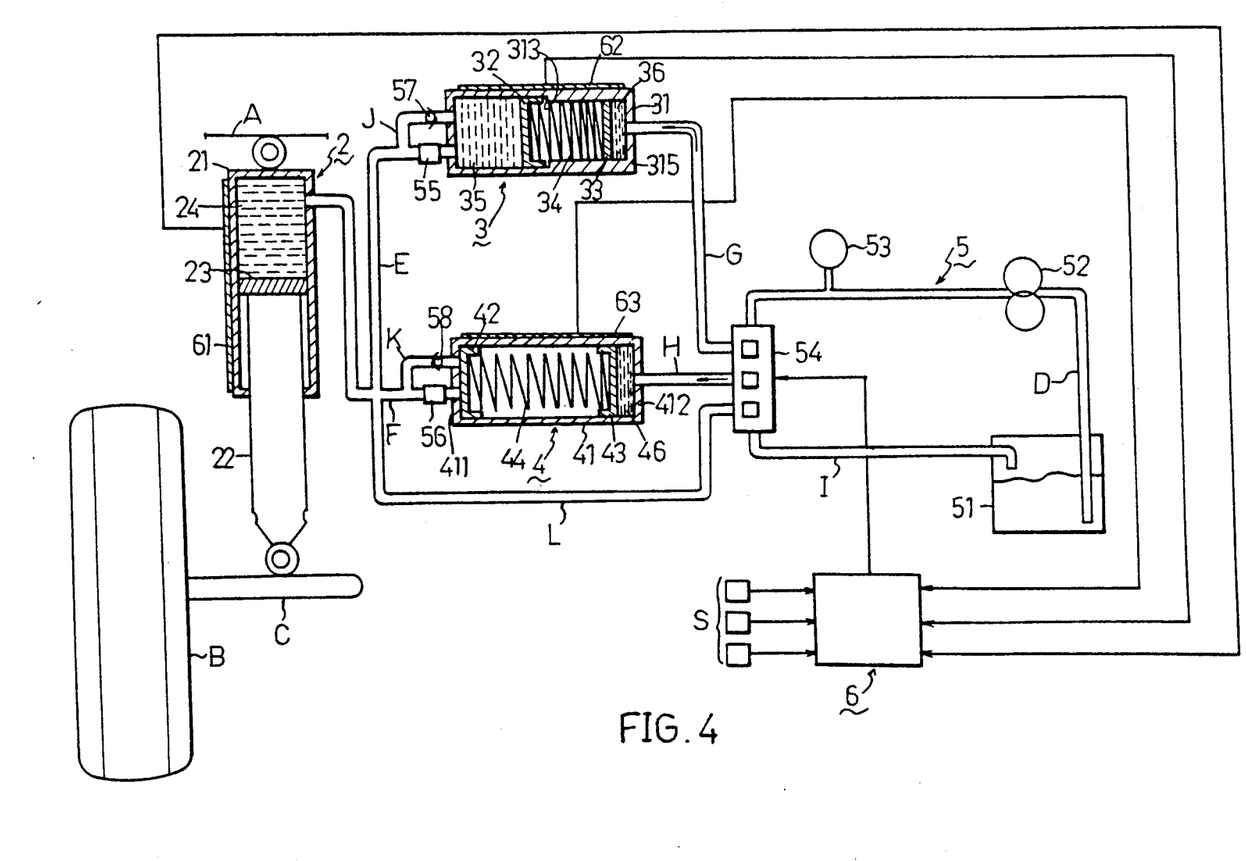
FIG. 4 illustrates the automobile suspension system of this invention after the automobile has been loaded with one or more people.

Referring to FIG. 4, after the automobile has been loaded with one or more people, the piston-position sensor 62 installed on the tensing hydraulic cylinder 3 detects the engagement of the upper tensing piston 32 with the shoulder 313, the processing system 6 signals the two-way valve 54 to open the fourth conduit (G). The opening of the fourth conduit (G) permits the flow of the oil in the accumulator 53 into the lower oil storing space 36 of the tensing hydraulic cylinder 3, causing the lower tensing piston 33 to move upward, moving the upper tensing piston 32 away from the shoulder 313. Once the upper tensing piston 32 has returned to the normal position shown in FIG. 2, the processing system 6 stops the movement of the lower tensing piston 33. On the other hand, when the piston-position sensor 63 detects the separation of the upper absorbing piston 42 from the upper end of the interior chamber of the absorbing hydraulic cylinder 4, the processing system 6 signals the two-way valve 54 to open the fifth conduit (H), so that the lower absorbing piston 43 is activated hydraulically to move upward until the upper absorbing piston 42 returns to the upper end of the interior chamber of the absorbing hydraulic cylinder 4. At this time, because the upper tensing piston 32 and the upper absorbing piston 42 are in the same positions as they are shown in FIG. 2, the suspending piston 23 is also located at the normal position shown in FIG. 2. In other words, the height of the automobile body is adjusted to the same level, whether the automobile is loaded or not.

Figure 5:
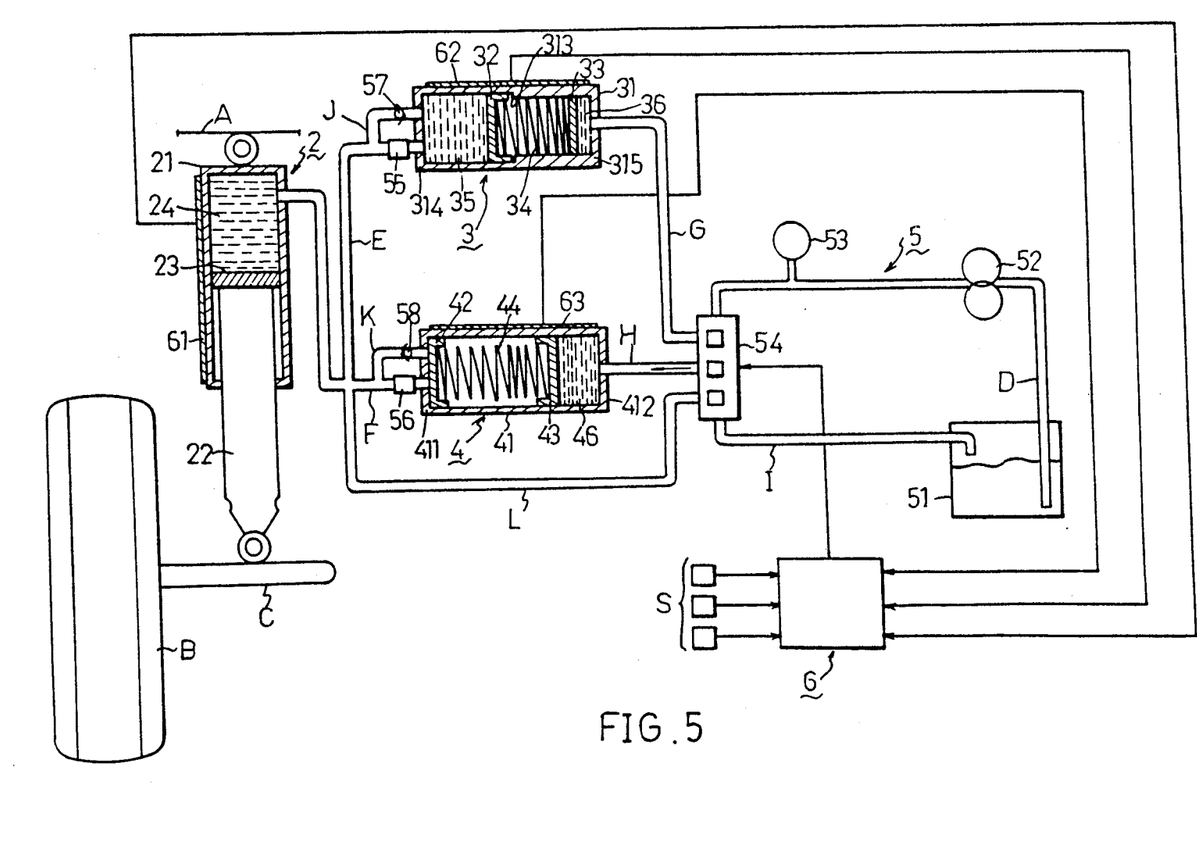
FIG. 5 illustrates the automobile suspension system of this invention when the automobile is accelerated.

Referring to FIG. 5, when the automobile speed reaches 60 km/hour, the processing system 6 signals the two-way valve 54 to open the fifth conduit (H), so that the lower absorbing piston 43 is moved upward a preset distance. When the automobile speed continues to increase to another predetermined value, the lower absorbing piston 43 further compresses the tensing spring 44. Accordingly, the higher the automobile speed, the greater the resistance to the upward movement of the suspending piston 23, thereby increasing driving safety. The upper absorbing piston 42 is fixed at the upper end of the interior chamber of the absorbing hydraulic cylinder 4 during the compression process of the absorbing spring 44 by the lower absorbing piston 43. That is to say, there is no change of the height of the automobile body during the compression of the absorbing spring 44. This constancy of height is considered to be a feature of this invention.

Figure 6:
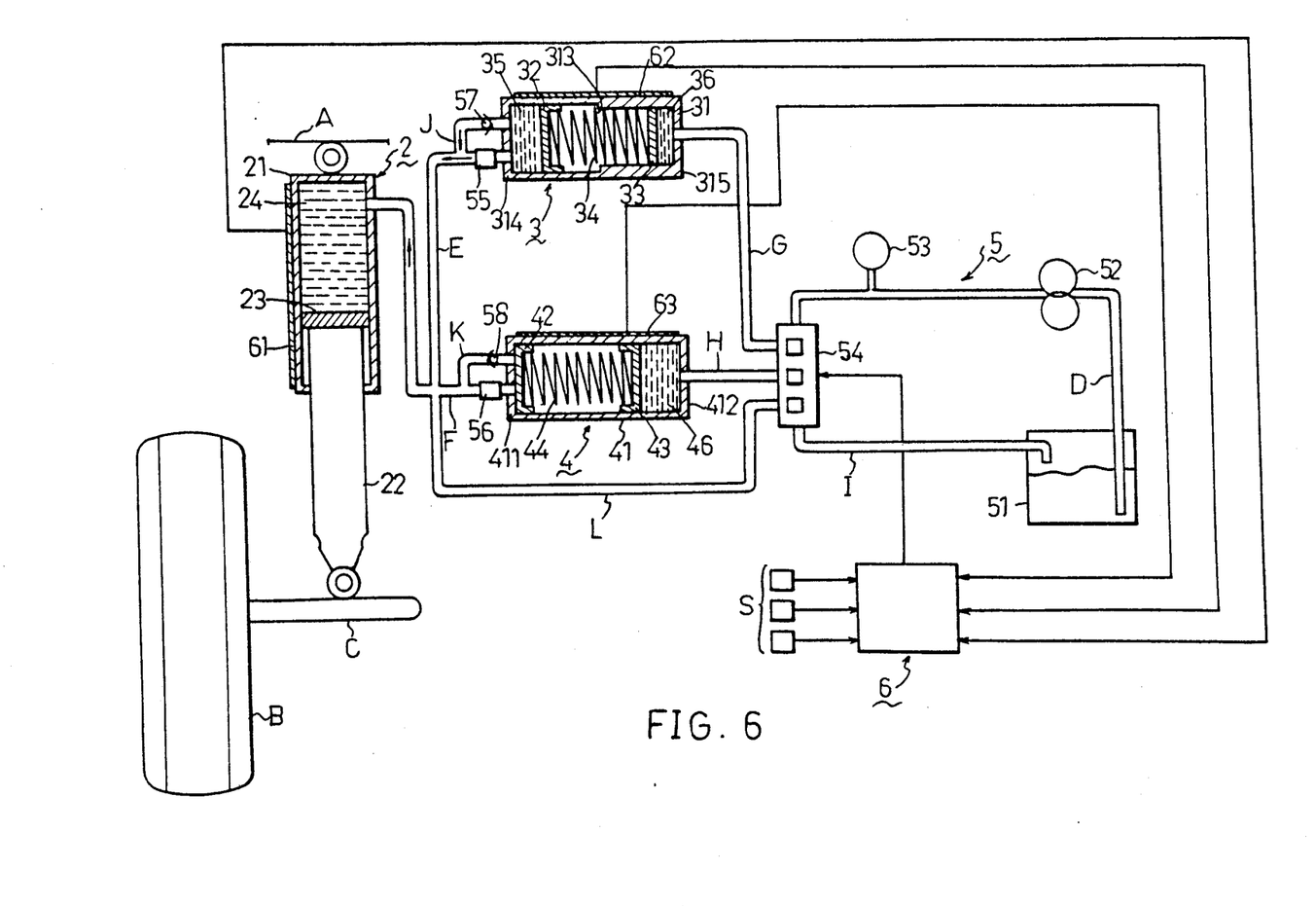
FIG. 6 illustrates the automobile suspension system of this invention when the automobile wheel rolls onto concave ground, such as potholes and divots.

Referring to FIG. 6, when the automobile wheel (B) rolls onto concave ground, the suspending piston 23 of the suspending hydraulic cylinder 2 moves downward, so as to increase the volume of the oil storing space 24 of the suspending hydraulic cylinder 2. But the upper absorbing piston 42 cannot move upward at the same time and cannot squeeze oil into the oil storing space 24 of the suspending hydraulic cylinder 2 through the third conduit (F). Therefore, oil is squeezed into the oil storing space 24 of the suspending hydraulic cylinder 2 by the spring action of the tensing spring 34. In this case, because oil flows from the upper oil storing space 35 of the tensing hydraulic cylinder 3 through the second conduit (E) and the seventh conduit (J), oil can be rapidly injected into the oil storing space 24 of the suspending hydraulic cylinder 2, so that the automobile wheel (B) can maintain contact with the concave surface without jolting the automobile. With the first check valve 57 installed on the seventh conduit (J), after the automobile wheel (B) has rolled over a concave surface feature, oil returns slowly from the oil storing space 24 of the suspending hydraulic cylinder 2 to the upper oil storing space 35 through the second conduit (E), so as to prevent the high-speed restoring movement of the suspending piston 23, which would jolt the occupants in the automobile uncomfortably.

Figure 7:
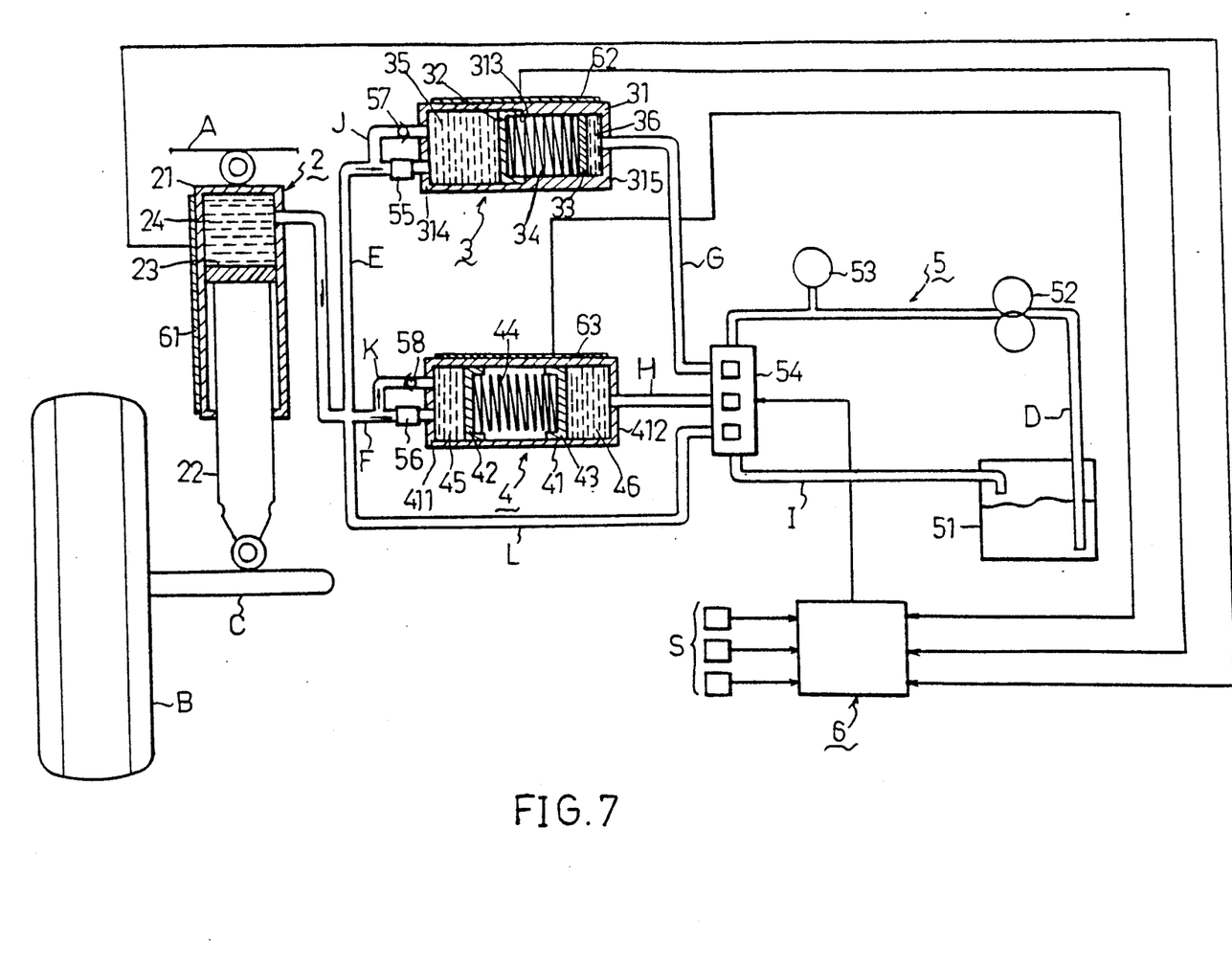
FIG. 7 illustrates the automobile suspension system of this invention when the automobile wheel rolls onto convex ground, such as raised bumps and road debris.

Referring to FIG. 7, when the automobile wheel (B) rolls onto a convex surface feature like a raised bump, the suspending piston 23 of the suspending hydraulic cylinder 2 moves upward to squeeze the oil therein toward the tensing hydraulic cylinder 3 and the absorbing hydraulic cylinder 4. At the same time, the upper tensing piston 32 moves downward until it contacts the shoulder 313, allowing the oil flowing from the oil storing space 23 of the suspending hydraulic cylinder 2 to enter rapidly the absorbing hydraulic cylinder 4 through the third conduit (F) and the eighth conduit (K). With the second check valve 58 installed on the eighth conduit (K), after the automobile wheel (B) has rolled over a convex surface feature, the absorbing spring 44 pushes the upper absorbing piston 42 upward, so that oil flows slowly from the absorbing hydraulic cylinder 4 through the eighth conduit (K). The slow movement of the oil from the absorbing hydraulic cylinder 4 prevents vibrating of the automobile body.

Figure 8:
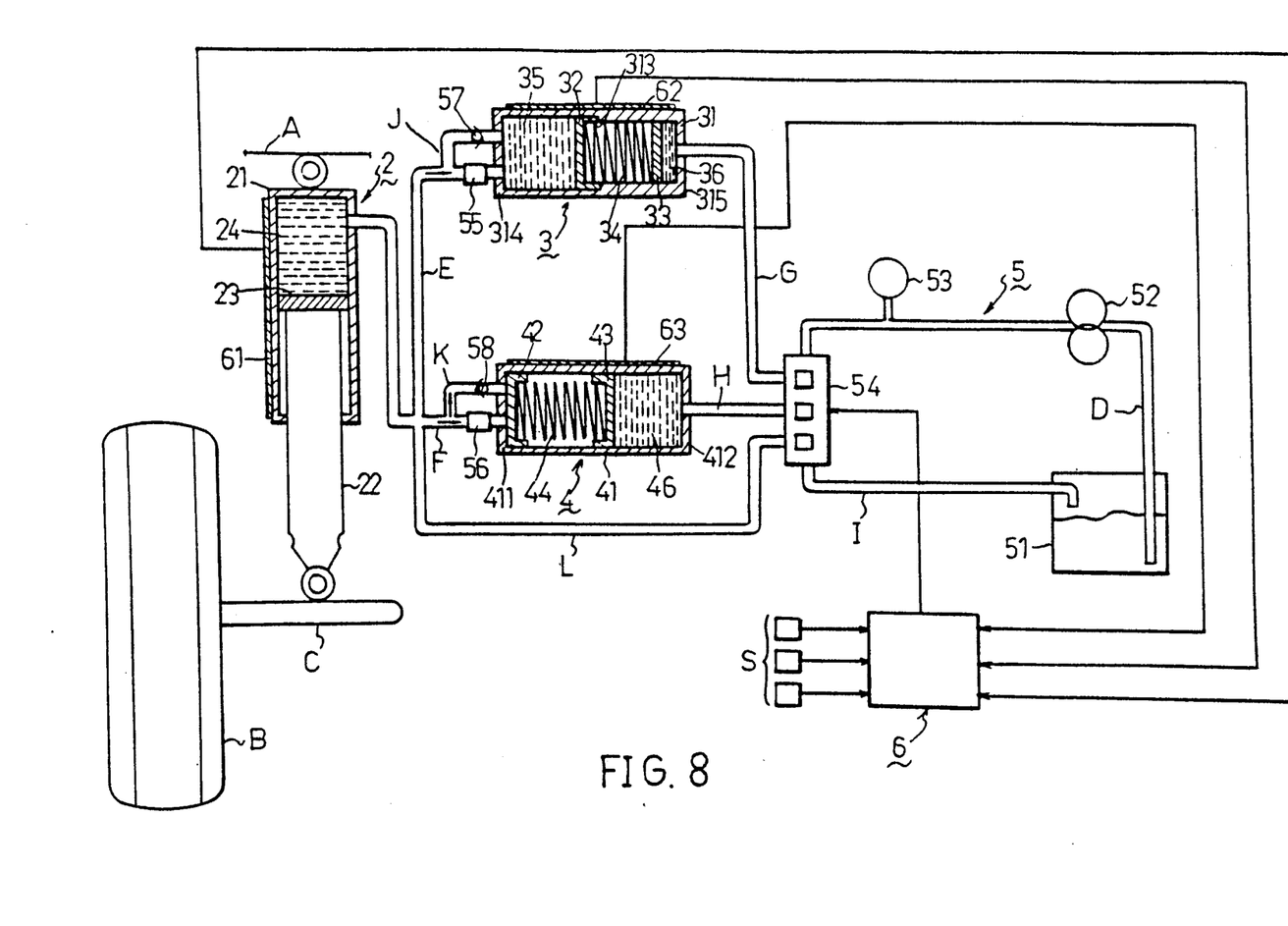
FIG. 8 illustrates the automobile suspension system of this invention when the automobile body is in an unbalanced condition.

Referring to FIG. 8, when the sensors (S) detect unbalance of the automobile body which can result from steering, braking or acceleration, the suspending piston 23 of the suspending hydraulic cylinder 2 tends to move upward, thus squeezing the oil therefrom into the tensing hydraulic cylinder 3 and the absorbing hydraulic cylinder 4. At the same time, the upper tensing piston 32 moves a small distance to contact the shoulder 313 and cannot continue to move, thus causing the remainder of the oil from the suspending hydraulic cylinder 2 to flow entirely into the absorbing hydraulic cylinder 4. When the downward movement of the upper absorbing piston 42 is detected, the piston-position sensor 63 signals the processing system 6, which causes the oil from the accumulator 53 to move upward through the fifth conduit (H), thereby pushing the lower absorbing piston 43 upward. As a result, the displacement of the suspending piston 23 is very small. The small displacement of the suspending piston 23 diminishes the inclination of the automobile during steering, braking and acceleration of the automobile.

Figure 9:
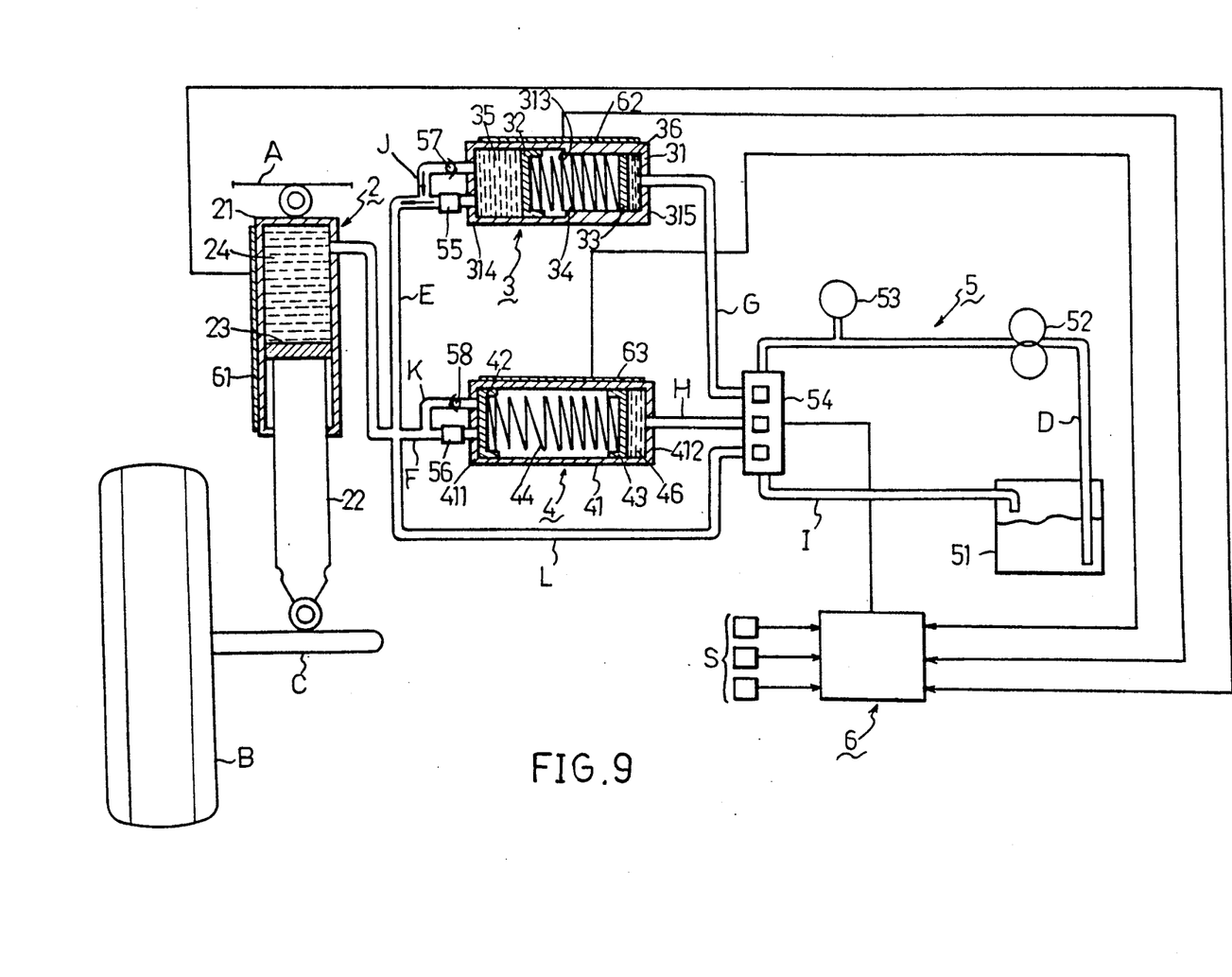
FIG. 9 illustrates the automobile suspension system of this invention when the automobile has just been unloaded.

Referring to FIG. 9, when the automobile stops and is unloaded, the suspending cylinder body 21 moves upward relative to the automobile wheel (B), so as to increase the volume of the oil storing space 24 of the suspending hydraulic cylinder 2. In this situation, the tensing spring 34 urges the upper tensing piston 32 to move upward, so as to squeeze the oil from the tensing hydraulic cylinder 3 to the suspending hydraulic cylinder 2. In a case where the automobile is parked, when the upward movement of the upper tensing piston 32 is detected, the piston-position sensor 62 signals the processing system 6 to open the two-way valve 54, so as to return the oil in the lower oil storing space 36 of the tensing hydraulic cylinder 3 and in the lower oil storing space 46 of the absorbing hydraulic cylinder 4 to the oil tank 51. Finally, all the pistons 23, 32, 33, 42 and 43 return to the normal positions shown in FIG. 2.

Figure 10:
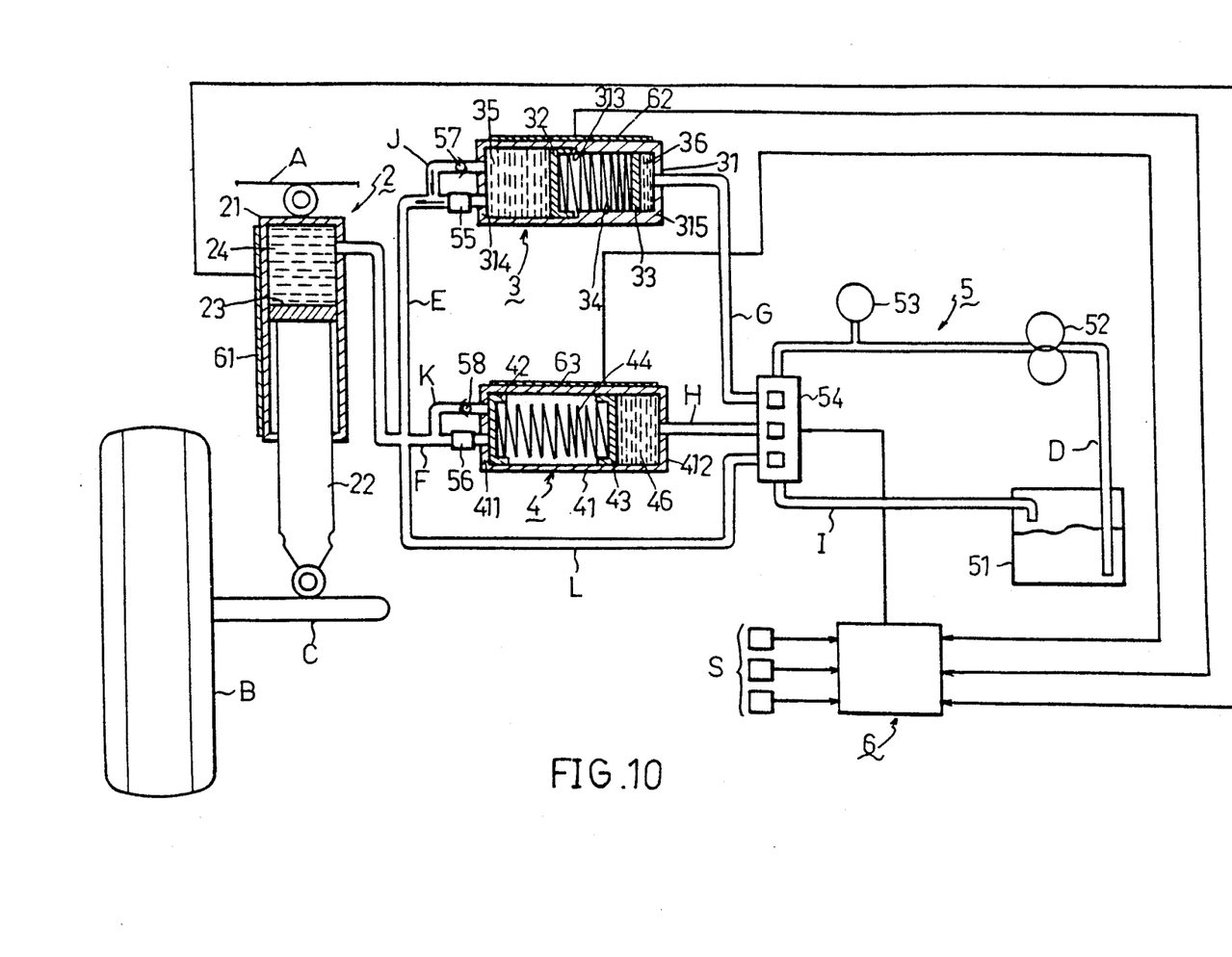
FIG. 10 illustrates the automobile suspension system of this invention when the automobile body is lowered.

Referring to FIG. 10, when the automobile advances rapidly with good road conditions, the driver can manually actuate the piston-position sensor 63 to open the ninth conduit (L), so that the oil in the suspending hydraulic cylinder 2 flows back to the oil tank 51 through the ninth conduit (L) and the sixth conduit (I). In this way, the automobile body is lowered, steadying the ride.

With this invention thus explained, it is apparent that numerous modifications and variations can be made without departing from the scope and spirit of this invention. It is therefore intended that this invention be limited only as indicated in the appended claims.

I claim:
1. An automobile suspension system comprising:

a suspending hydraulic cylinder including a suspending cylinder body adapted to be connected pivotally to a bottom of an automobile body, a suspending piston rod adapted to be connected pivotally to a swing arm of an automobile wheel, and a suspending piston connected to said piston rod at an upper end thereof defining an oil storing space above said suspending piston in said suspending cylinder body;

a tensing hydraulic cylinder including a tensing cylinder body fixed on said automobile body and having a thin upper wall portion which defines an upper chamber therein and a thick lower wall portion which defines a lower chamber therein, an upper tensing piston disposed slidably in said upper chamber defining an upper oil storing space above said upper tensing piston in said tensing cylinder body, a lower tensing piston disposed slidably in said lower chamber defining a lower oil storing space below said lower tensing piston in said tensing cylinder body, and a tensing spring interposed between said upper tensing piston and said lower tensing piston so as to bias said upper and lower tensing pistons to separate, said upper wall portion and said lower wall portion defining a shoulder therebetween, said upper tensing piston being positioned near, but not in contact with said shoulder and said lower tensing piston being positioned in a lower end of said lower chamber when said automobile is unloaded;

an absorbing hydraulic cylinder including an absorbing cylinder body fixed on said automobile body defining an interior chamber therein, an upper absorbing piston disposed in said absorbing cylinder body, a lower absorbing piston disposed in said absorbing cylinder body, and an absorbing spring interposed between said upper absorbing piston and said lower absorbing piston so as to bias said upper and lower absorbing pistons to separate, said upper absorbing piston being positioned in an upper end of said interior chamber of said absorbing cylinder body and said lower absorbing piston being positioned in a lower end of said interior chamber of said absorbing cylinder body when said automobile is unloaded;

a hydraulic piping system including an oil tank, a two-way valve, a first damper, a second damper, a first conduit intercommunicating said oil tank and said two-way valve, an oil pump forcing oil in said oil tank to said two-way valve, an accumulator installed on said first conduit between said oil pump and said two-way valve, a second conduit intercommunicating said oil storing space of said suspending hydraulic cylinder and said upper oil storing space of said tensing hydraulic cylinder, a third conduit intercommunicating said oil storing space of said suspending hydraulic cylinder and said upper oil storing space of said absorbing hydraulic cylinder, a fourth conduit intercommunicating said two-way valve and said lower oil storing space of said tensing hydraulic cylinder, a fifth conduit intercommunicating said two-way valve and said lower oil storing space of said absorbing hydraulic cylinder, and a sixth conduit intercommunicating said two-way valve and said oil tank so that oil can flow back from said two-way valve to said oil tank, said first damper being installed on said second conduit so as to stabilize spring movement of said tensing spring, said second damper being installed on said third conduit so as to stabilize spring movement of said absorbing spring; and a processing system including a logical circuit unit for detecting steering, braking or acceleration of said automobile body to signal said two-way valve, so as to open said fifth conduit, thereby activating said lower absorbing piston to move upward, upward movement of said lower absorbing piston preventing downward movement of said upper absorbing piston, said logical circuit unit including two piston-position sensors installed respectively on said tensing hydraulic cylinder and said absorbing hydraulic cylinder, said piston-position sensor installed on said tensing hydraulic cylinder signaling said two-way valve, in response to increase of load on said automobile body, to push hydraulically said lower tensing piston, thereby impelling said upper tensing piston with said tensing spring, and in response to decrease of load on said automobile body, to return oil in said lower oil storing space of said tensing hydraulic cylinder to said oil tank through said sixth conduit.

2. An automobile suspension system as claimed in claim 1, wherein said processing system detects a predetermined automobile speed to signal said two-way valve to open said fifth conduit, so that said lower absorbing piston is moved upward a preset distance.

3. An automobile suspension system as claimed in claim 1, wherein decrease of load on said automobile body causes said processing system to open said two-way valve, so that oil in said absorbing hydraulic cylinder flows back to said oil tank through said sixth conduit.

4. An automobile suspension system as claimed in claim 1, wherein increase of load on said automobile body causes said processing system to push hydraulically said lower absorbing piston upward.

5. An automobile suspension system as claimed in claim 1, wherein said hydraulic piping system includes a seventh conduit which is branched from said second conduit and communicated with said upper oil storing space of said tensing hydraulic cylinder, said seventh conduit being equipped with a first check valve which limits oil flowing from said tensing hydraulic cylinder to said suspending hydraulic cylinder through said seventh conduit.

6. An automobile suspension system as claimed in claim 1, wherein said hydraulic piping system includes an eighth conduit which is branched from said third conduit and communicated with said upper oil storing space of said absorbing hydraulic cylinder, said eighth conduit being equipped with a second check valve which limits oil flowing from said suspending hydraulic cylinder to said absorbing hydraulic cylinder 7. An automobile suspension system as claimed in claim 1, wherein said hydraulic piping system includes a ninth conduit intercommunicating said two-way valve and said oil storing space of said suspending hydraulic cylinder, whereby, said oil storing space of said suspending hydraulic cylinder can be directly communicated with said oil tank.

* * * * *